United States Patent [19]
Kim

[11] Patent Number: 6,072,262
[45] Date of Patent: Jun. 6, 2000

[54] SLOT-LESS MOTOR FOR SUPER HIGH SPEED DRIVING

[75] Inventor: Ki-Bong Kim, Suwon, Rep. of Korea

[73] Assignee: Samsung Electronics Co., Ltd., Suwon, Rep. of Korea

[21] Appl. No.: 09/207,037

[22] Filed: Dec. 8, 1998

[30]     Foreign Application Priority Data

Jul. 21, 1998  [KR]   Rep. of Korea ...................... 98-29318

[51] Int. Cl.[7] ............................ H02K 5/128; H02K 1/18
[52] U.S. Cl. ............................. 310/254; 310/86; 310/194
[58] Field of Search ............... 310/254, 86, 194

[56]           References Cited

U.S. PATENT DOCUMENTS

| | | | |
|---|---|---|---|
| 2,698,911 | 1/1955 | Schaefer | 310/86 |
| 2,919,359 | 12/1959 | Luenberger | 310/86 |
| 4,086,508 | 4/1978 | Masumoto et al. | 310/86 |
| 4,492,889 | 1/1985 | Fukushi et al. | 310/87 |
| 4,514,652 | 4/1985 | Olson | 310/54 |
| 4,709,180 | 11/1987 | Denk | 310/179 |
| 5,396,138 | 3/1995 | Steiner | 310/254 |
| 5,455,470 | 10/1995 | Denk et al. | 310/90 |

*Primary Examiner*—Nestor Ramirez
*Assistant Examiner*—Burton S. Mullins
*Attorney, Agent, or Firm*—Burns, Doane, Swecker & Mathis, L.L.P.

[57]           ABSTRACT

A slot-less motor for super high speed driving by which a stator coil is not detached from a housing even at a super high speed of rotation of the slot-less motor, and an air gap flux density for super high speed driving is easily obtained and is uniformly maintained, the slot-less motor employing a stator coil bonded to an inner surface of a housing for maintaining an air gap with a rotor magnet fixed to a rotor shaft to form a stator, wherein the slot-less motor comprises a cylindrical stator ring made of material with low relative magnetic permeability and disposed between a magnet and a stator coil in order to maintain an air gap flux density appropriate for super high speed rotation, and for being distanced from the magnet at a predetermined space to press the stator coil and to be fixed by a coupling unit for fixation and keep within a predetermined space.

3 Claims, 3 Drawing Sheets

SLOT-LESS MOTOR FOR SUPER HIGH SPEED DRIVING

BACKGROUND OF THE INVENTION

1. Field of the Invention

The present invention relates to a slot-less motor, and more particularly to a slot-less motor for super high speed driving for easily obtaining an air gap flux density and preventing a stator coil from being separated.

2. Description of the Prior Art

Generally, a slot-less motor is used as an appropriate device for a motor for super high speed driving because it can easily make distribution of field magnetic flux to an ideal sinusoidal wave.

The slot-less motor includes as illustrated in FIGS. 4 and 5, a cylindrical housing 50 forming a stator, a stator coil 51 wound in a predetermined shape within the housing 50 for being tightly secured thereinto, a magnet 53 mounted at an outer surface of a rotor shaft 52 in order to maintain a predetermined distance of air gap (d) from the stator coil 51 and a housing cap 55 secured at both sides of the housing 50 in order to support both ends of the rotor shaft 52 by bearings 54.

The stator coil 51 is not provided with a slot at the housing 50 for its winding and fixing, such that the stator coil 51 is wound beforehand in a predetermined shape, secured at an inner surface of the housing 50, and bonded as such or impregnated in adhesive materials such as bond 56 and the like to thereafter be fixed therein. Particularly in this case, the air gap (d) between the magnet 53 of a rotor and the coil 51 which determine a rotary speed and torque of a rotor during fixation of the stator coil 51 should maintain a relatively wide breadth in order to adapt to high speed.

Furthermore, the stator coil 51 should be tightly secured to the inner surface of the housing 50 lest it should be detached therefrom due to vibration and the like when the rotor is rotated at a high speed.

As described above, in order to drive the slot-less motor at a super high speed, an air gap flux density should be relatively sparse, such that, when the stator coil 51 is bonded by impregnation or the like, the air gap flux density must be made to become low while the air gap (d) between the magnet 53 and the stator coil 51 maintain a relatively uniform space therebetween.

However, there is a problem in that, when the slot-less motor is manufactured by the method thus described, and the stator coil is fixed by impregnation, the stator coil is detached from the housing due to low fixing force of the bond and vibration generated in the course of high speed of rotation, or the slot-less motor should be driven at a slower rotating speed in order to prevent the stator coil from being separated from the housing.

In order words, because there is a limit in fixing the coil by way of bond, it is practically impassible to increase the rotating speed of the slot-less motor beyond a predetermined speed limit. Furthermore, as the capacity of the motor is increased, so is the diameter of the stator coil, such that when a separate slot is not available or when the fixing force of the bond does not surpass a predetermined limit, it is difficult to form a coil or to perform the fixing operation. There is still another problem in that a uniform air gap flux density can hardly be obtained when the diameter of the stator coil is increased.

SUMMARY OF THE INVENTION

Accordingly, the present invention is disclosed to solve the aforementioned problems and it is an object of the present invention to provide a slot-less motor for super high speed driving by which a stator coil is not detached from a housing even at a super high speed of rotation of the slot-less motor, and an air gap flux density for super high speed driving is easily obtained and is uniformly maintained.

In accordance with the object of the present invention, there is provided a slot-less motor for super high speed driving, the slot-less motor employing a stator coil bonded to an inner surface of a housing for maintaining an air gap with a rotor magnet fixed to a rotor shaft to form a stator, wherein the slot-less motor comprises a cylindrical stator ring made of material with low relative magnetic permeability and disposed between a magnet and a stator coil in order to maintain an air gap flux density appropriate for super high speed rotation, and for being distanced from the magnet at a predetermined spaced to press the stator coil and to be fixed by coupling means for fixation and keep within a predetermined space.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1:
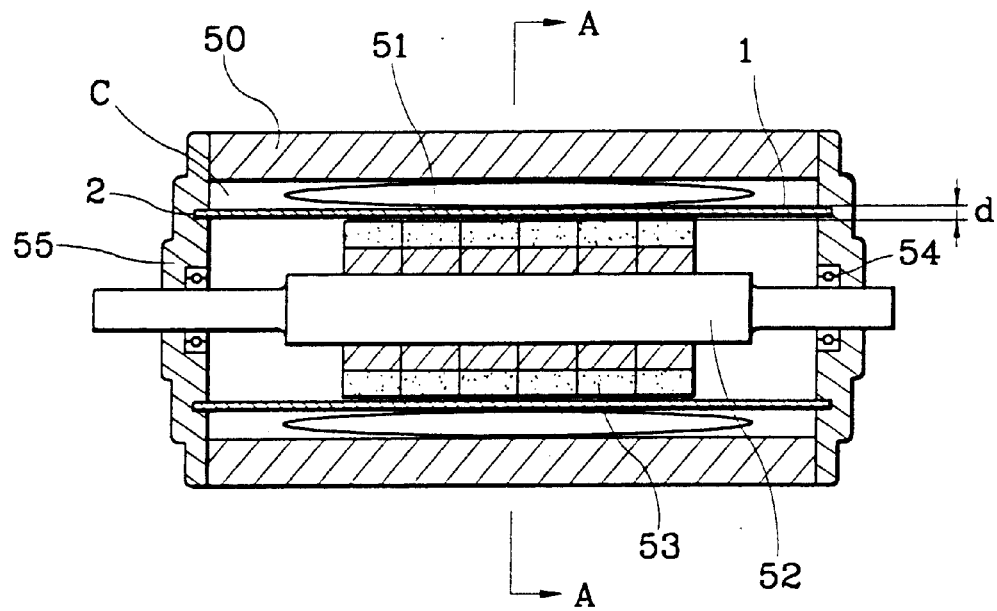
FIG. 1 is a sectional view for illustrating a slot-less motor for super high speed driving according to the present invention.
Figure 2:
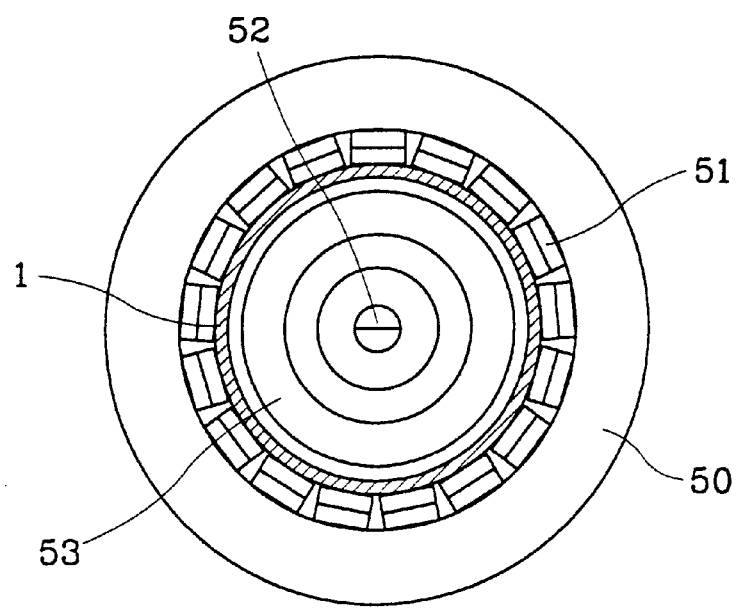
FIG. 2 is a sectional view taken along line A—A in FIG. 1.

FIG. 1 is a sectional view for illustrating a slot-less motor for super high speed driving according to the present invention and FIG. 2 is a sectional view taken along line A—A in FIG. 1. As illustrated in the drawings, the slot-less motor for super high speed driving according to the present invention includes a cylindrical stator ring 1 positioned between a rotor magnet 53 fixed to a rotor shaft 52 and a stator coil 51 distanced to maintain an air gap flux density appropriate to a super high speed rotation, and distanced from the rotor magnet 53 at a predetermined space to press the stator coil 51 to be fixed by coupling means for fixation and keep within a predetermined space.

In other words, the stator ring 1 serves to compress the stator coil 51 towards the housing 50 and to maintain and fix the stator coil 51 to a chamber (c) formed between the stator ring 1 and the housing 50, such that detachment of the stator coil 51 due to vibration of super high speed rotation can be prevented.

The stator ring 1 is made of material with low relative magnetic permeability (by way of example, stainless steel) lest the flux between the rotor magnet 53 and the stator coil 51 should be affected.

Figure 3:
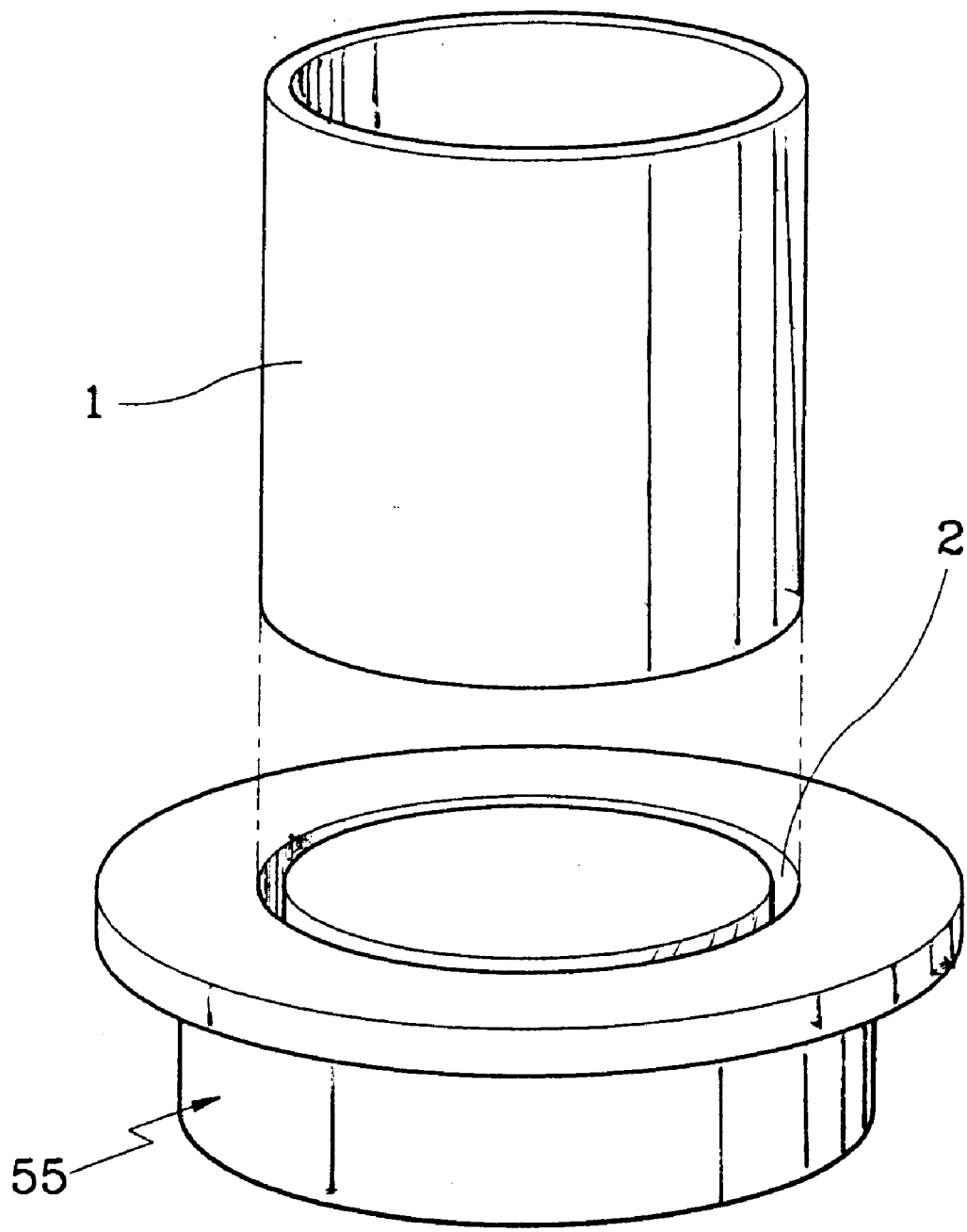
FIG. 3 is an exploded perspective view for illustrating a coupled state between a stator ring and a housing cap in FIG. 1.
Figure 4:
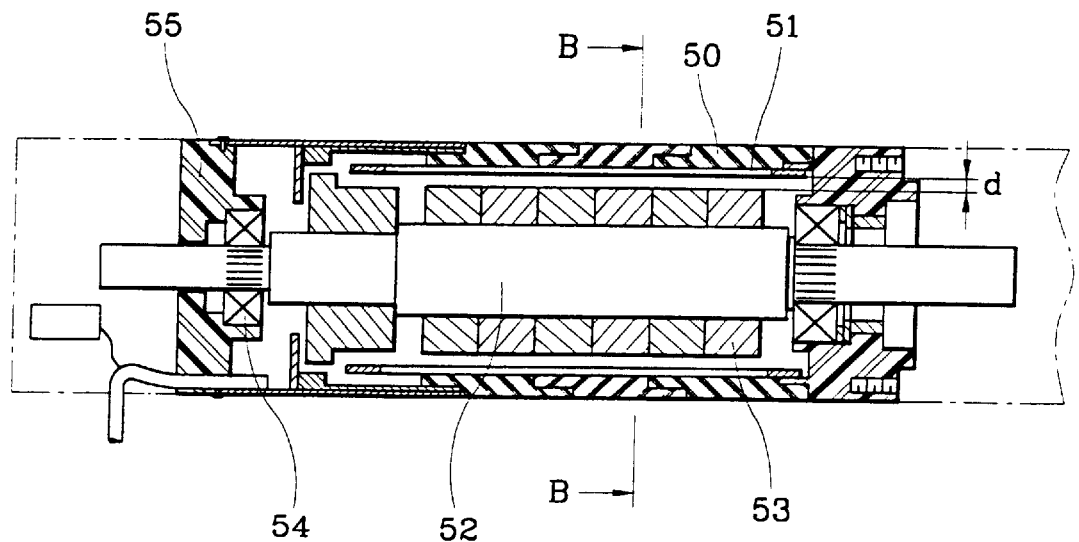
FIG. 4 is a sectional view for illustrating a conventional slot-less motor.
Figure 5:
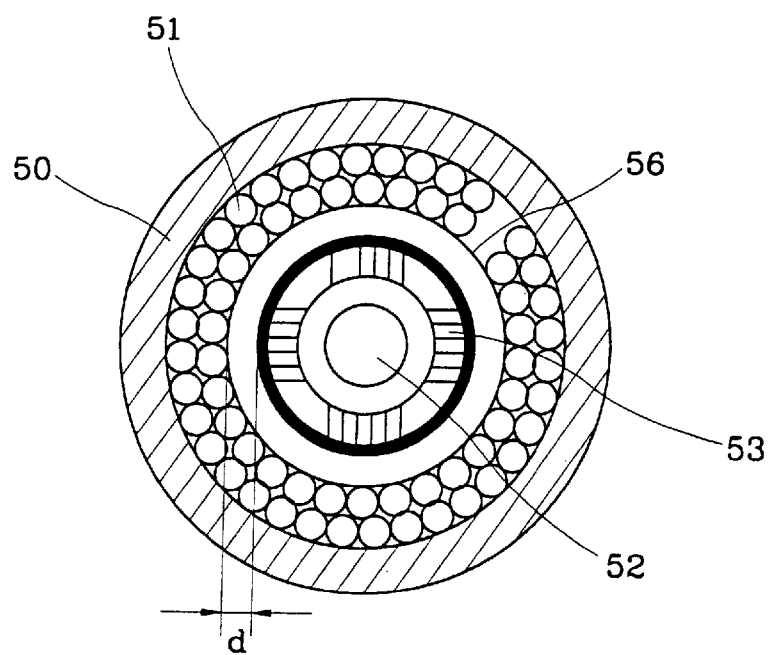
FIG. 5 is a sectional view taken along line B—B in FIG. 4.

The coupling means, as illustrated in FIG. 3, is positioned opposite to a housing cap 55 and includes an insertion groove 2 for the stator ring 1 to be inserted thereinto. In other words, when the insertion groove 2 having same radius is formed on each housing cap 55, the insertion groove 2 is inserted by the cylindrical stator ring 1 and fixed therein.

An optimum distance to be maintained between the stator ring 1 and the rotor magnet 53 is approximately 0.3~1.0 mm and an optimal thickness of the stator ring is approximately 1~2 mm.

In other words, in view of the distance thus described, the air gap is considered to be approximately 1.3~3.0 mm, where the thickness of the stator ring 1 ultimately functions as an air gap, such that, when the thickness of the stator ring 1 is added by distance between the rotor magnet 53 and the stator ring 1, it is easy to control the air gap. By this, it becomes easy to control the air gap flux density relatively at low and uniform level.

Now, operational effect of the present invention will be described.

First of all, the housing cap 55 is inserted at one end thereof into one end of the rotor shaft equipped with the rotor magnet 53, and the insertion groove 2 is inserted and fixed by one end of the stator ring 1.

When the stator ring 1 is inserted and fixed at one end thereof, the housing 50 bonded with the stator coil 51 is coupled to a periphery thereof and the housing cap 55 is coupled to the other end for completion of motor assembly.

The air gap can be accurately maintained because position and width of the insertion groove 2 and thickness of the stator ring 1 are accurately and uniformly processed.

Furthermore, the stator coil 51 is compressed between an outer diameter of the stator ring 1 and a minor diameter of the housing 50, thereby preventing the stator coil 51 from being detached from the housing 50 by the vibration and the like.

When the fixing force of the stator coil 51 is markedly improved by the stator ring 1, a slower driving can be avoid, resulting from a prior danger where the stator coil 51 is separated, such that a higher rotating speed can be obtained compared with a motor of the same specifications.

Now, operation of the motor will be described.

When a power is applied to the slot-less motor, the rotor shaft 52 is rotated by flux formed between the stator coil 51 and the magnet 53. At this time, an air gap formed between the magnet 53 and the stator coil 51 is adjusted in size thereof by the thickness of the stator ring 1, where an air gap flux density in the air gap can be lowed as much as the distance adjusted by the thickness of the stator ring 1. By this, decrease of flux density necessary for super high speed of rotation can be easily obtained, enabling the super high speed of the rotor shaft 52.

Furthermore, the stator ring 1 is made of material having a very low relative magnetic permeability, such that the flux formed between the magnet 53 and the stator coil 51 has the same effect of passing the air gap when it passes the stator ring 1, thereby providing no effect to the whole flux.

As mentioned above, although the rotor shaft 52 is rotated at a super high speed, the speed reaching up to approximately 50,000 rpm and vibration generated from the super high speed of rotation is transmitted to the stator coil 51, the stator coil 51 is not detached from the housing 50 as it is compressed by the stator ring 1.

When the stator coil 51 is not detached even during the super high speed of rotation, a motor having a higher output or a motor rotating at a super high speed can be manufactured of course, inner surface of the stator ring 1 is very uniformly processed to enable to maintain a predetermined space with the rotor magnet 53 and to prevent interference or collision.

As apparent from the foregoing, there is an advantage in the slot-less motor for super high speed driving according to the present invention, in that a stator ring made of low relative magnetic permeability material is disposed between a rotor magnet and a stator coil to fix and support the stator coil, such that the stator coil is prevented from being detached from a housing during super high speed rotation of the slot-less motor, whereby the slot-less motor can obtain a more increased rotating speed than that of a conventional slot-less motor.

What is claimed is:

1. A slot-less motor for super high speed driving, the slot-less motor employing a housing containing a stator coil to form a stator, and a rotor magnet fixed to a rotor shaft to maintain an air gap from the stator coil, wherein the slot-less motor further comprises:

a stator ring disposed between the rotor magnet and the stator coil and formed with an inner radius larger than an outer radius of the rotor magnet, an outer circumference of the stator compressing the stator coil to thereby cause the stator coil to be fixed and maintained in a predetermined space; and coupling means for causing the stator ring to be fixed and positioned between the housing and a housing cap so as to position an outer circumferential surface of the rotor magnet at a uniform distance from an inner circumferential surface of the stator coil.

2. The slot-less motor as defined in claim 1, wherein there are two of the housing caps each disposed at a respective end of the housing, the coupling means comprises insertion grooves, each being formed opposite each other in respective sides of the housing caps, through which both ends of the stator ring are inserted and fixed therein.

3. The slot-less motor as defined in claim 1, wherein the stator ring is made of material having a low relative magnetic permeability.

* * * * *